United States Patent
Yang et al.

(10) Patent No.: US 8,433,833 B2
(45) Date of Patent: Apr. 30, 2013

(54) DYNAMIC REASSIGNMENT FOR I/O TRANSFERS USING A COMPLETION QUEUE

(75) Inventors: Jisoo Yang, Beaverton, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/075,959

(22) Filed: Mar. 30, 2011

(65) Prior Publication Data

US 2012/0254484 A1    Oct. 4, 2012

(51) Int. Cl.
*G06F 3/00* (2006.01)
(52) U.S. Cl.
USPC ............................................. 710/47; 710/58

(58) Field of Classification Search .......................... None
See application file for complete search history.

(56) References Cited

U.S. PATENT DOCUMENTS

2006/0026214 A1 * 2/2006 Berg et al. ..................... 707/201

* cited by examiner

*Primary Examiner* — Idriss N Alrobaye
*Assistant Examiner* — Richard B Franklin
(74) *Attorney, Agent, or Firm* — Blakely, Sokoloff, Taylor & Zafman LLP

(57) ABSTRACT

In some embodiments of the present invention, host systems and/or devices are made to be capable of employing asynchronous or synchronous modes. For example, for storage devices capable of finishing I/O requests in a sufficiently small amount of time, e.g., a few microseconds, host system software may perform the storage I/O request synchronously by polling for a completion.

6 Claims, 3 Drawing Sheets

DYNAMIC REASSIGNMENT FOR I/O TRANSFERS USING A COMPLETION QUEUE

TECHNICAL FIELD

The present invention relates generally to computing systems and in particular, to techniques for processing storage drive transactions in a host system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
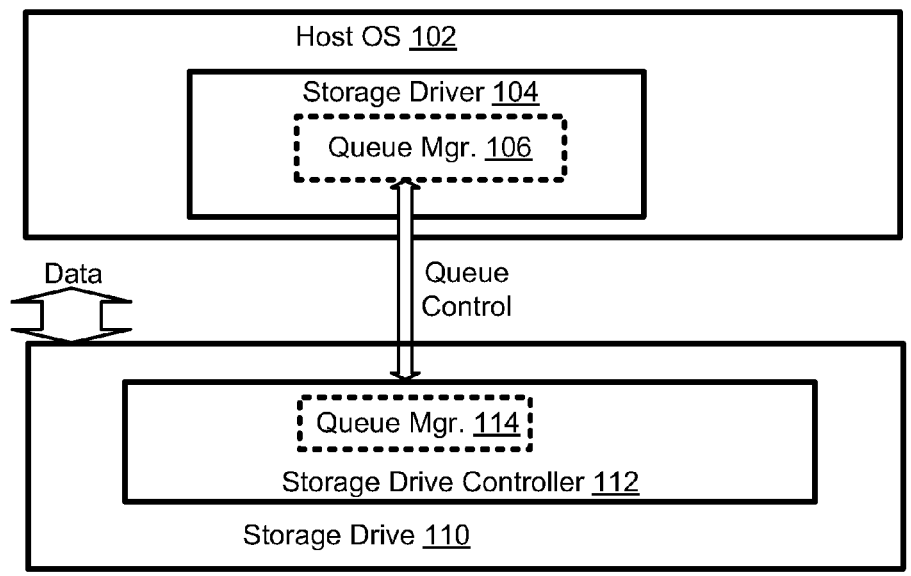
FIG. 1 is a diagram showing a host to storage drive transfer management scheme in accordance with some embodiments.

In host computing systems such as with server computers, personal computers, portable computing devices, and the like, operating systems typically handle storage I/O requests asynchronously. That is, with an asynchronous storage drive queue process, the CPU (or thread) issuing the host-to-I/O transfer request suspends when the request is submitted to the storage device. It then gets awoken later when the request is completed by the storage device. This asynchronous strategy frees the CPU while the storage drive is processing the I/O request. When the device is finished processing an I/O request, the device (e.g., storage drive) sends an interrupt signal to the CPU. The CPU then executes an interrupt handler routine that eventually wakes up the suspended process that initiated the I/O request. For many peripheral device transactions that take a relatively long time (e.g., hundreds of micro-seconds or even milliseconds) to complete, this approach may be worthwhile because the benefit of freeing up the CPU can exceed the cost, e.g., interrupt handling inefficiencies, of handling I/O requests asynchronously.

On the other hand, for storage devices capable of processing I/O requests in less than a few microseconds, for example, a system can benefit from performing I/O synchronously. Synchronous modes utilize polling, whereby the CPU spends clock cycles reading the storage device status information to check the completion of the outstanding I/O request. This approach can be beneficial because the overhead of maintaining asynchrony may not be justified when the process is left in a busy-wait state for such a short duration while the device completes the I/O transaction.

Currently, majority of devices employ asynchronous processing mode, while synchronous processing mode is limitedly employed by pseudo devices such as ramdisks. However, future devices, such as phase-change memory (PCM) based drives are expected to adopt synchronous modes because these devices are extremely fast. Unfortunately, in future host systems, host processes will likely have to request transactions (or transfers) to devices with different task processing latencies. So, using either just synchronous or asynchronous approaches may be less than ideal.

In some embodiments of the present invention, host systems and/or devices are made to be capable of employing asynchronous or synchronous modes. For example, for storage devices capable of finishing I/O requests in a sufficiently small amount of time, e.g., a few microseconds, host system software may perform the storage I/O request synchronously by polling for a completion. This may be beneficial because polling removes the overhead of context switching from interrupt handling and extends CPU parallelism with more particularity down to the device. At the same time, however, for I/O requests that take longer, spending excessive CPU cycles in polling may be avoided with the request being handled asynchronously.

Accordingly, it has been determined that in some embodiments, a reassignment ticket may be issued (e.g., from the storage device to the host process) to break the polling loop. In still further embodiments, the reassignment ticket may cause one completion queue to switch to another completion queue for the delivery destination of the completion notice.

FIG. 1 is a diagram showing portions of a host system to storage drive (device) interface in accordance with some embodiments. The host computing system (which may be a server, a personal computer, a smart phone, etc.) has an operating system 102, which controls transfer requests with a storage drive 110 via the storage drive's controller 112. The operating system, when running, includes a storage driver 104 that is associated with the storage drive 110. In the depicted embodiment, the storage driver 104 includes a queue manager 106 for implementing, in cooperation with a queue manager 114 of the drive controller 112, storage drive queues (requests) in accordance with some embodiments disclosed herein. In the depicted embodiment, it communicates, over a control interface, with the queue manager 114 of the storage drive controller 112 to process I/O queue requests for a synchronous process, an asynchronous process, or for a dynamically re-assignable process for transaction requests.

The storage driver 104 initiates one or more transfer request submission queues that may be dedicated for synchronous mode or for asynchronous mode, with or without the ability to dynamically transition to the other mode. These queues provide an interface between the storage drive controller 112 and the host driver 104 for the controller 112 to inform the host driver software 104 (the host storage driver) of the status of outstanding I/O requests. In some embodiments, the storage drive controller 112 may define the submission queues through which the host driver queue manager 106 can issue the storage I/O requests. In some embodiments, the completion and submission queues may be shared objects that appear in memory or I/O address spaces of the system.

Figure 2:
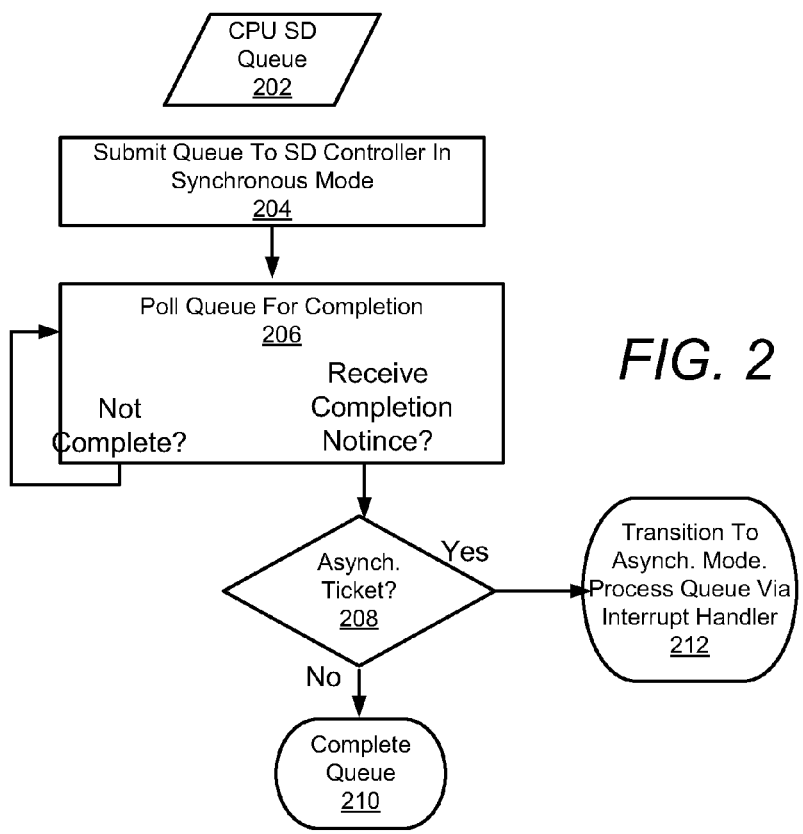
FIG. 2 is a routine for processing a storage drive transfer queue for the system of FIG. 1 in accordance with some embodiments.

FIG. 2 shows a routine for processing a Storage transfer request queue 202. For example, it may be implemented by the storage drive queue manager 106. In this embodiment, at 204, the queue is submitted by the CPU (or core thread). The CPU may issue it for synchronous mode, asynchronous mode, or it may submit it as a re-assignable queue. In some embodiments, when submitting it as a dynamically re-assignable queue, it may initially default to a selected one of the modes, e.g., it may default in the synchronous "polling" mode.

At 206, the CPU polls a completion queue to confirm/determine if the transfer request is completed. For example, when complete, a flag could set or a job completion ticket could be made available to the queue manager 106. If it is not yet completed, it cycles until it receives notification that the task is "completed" and proceeds to 208.

At 208, it determines if the task actually completed, or if it dynamically changed, e.g., as initiated by the controller 112, to an asynchronous mode. In some embodiments, the controller 112 may determine, e.g., from characteristics of the task indicating that it would take excessive time or from a time-out condition, that the task mode should be changed to asynchronous. If the task is completed, then the routine ends at 210. Likewise, if it determines that the process has changed to an asynchronous mode, then at 212, it moves on to something else, and the task is eventually wrapped up, by the CPU, via an interrupt handler within the OS space.

Figure 3:
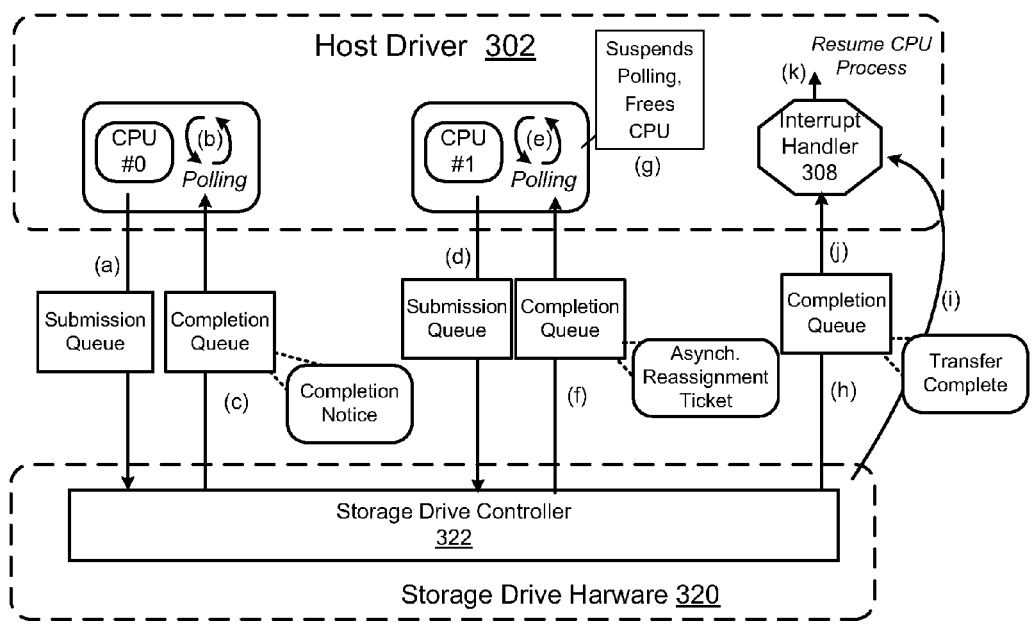
FIG. 3 is a diagram showing an exemplary queue processing scenario in accordance with some embodiments.

FIG. 3 is a diagram illustrating an example of a use of the reassignment ticket to facilitate switching from a polling (synchronous) mode into an interrupt-driven (asynchronous) mode. It shows two-CPU instances with two sets of submission and completion queue pairs for synchronous mode of operation (shown on the left and the middle of the figure) and one completion queue for asynchronous mode (shown on the right). (It should be noted that the CPU instances, as with the queues and channels between the host and SD controller, may be implemented with a suitable combination of virtual and/or physical structures.) In the figure, each CPU, at least initially, handles I/O requests in synchronous mode by default. (Note that it is assumed that the request made by CPU #0 takes a short amount of time, while the request made by CPU #1 takes a relatively long amount of time.

At steps (a) and (d), the host driver, via CPU #0 and CPU #1, respectively, issues an I/O request synchronously by submitting the request to its corresponding submission queue. After the submission, the host driver then starts polling for the completion status on the completion queue associated with the submission queue (steps (b) and (e)). If the time taken by the storage device to process the request is short enough, the device posts a completion notice on the completion queue (step (c) for CPU #0 process) when it is finished so that the host driver polling the completion queue will be notified of the I/O completion right away.

On the other hand, if the device detects a condition that suggests a much longer time to complete the request, the device posts a reassignment ticket on the completion queue that the host driver is currently polling (step (f)). In some embodiments, the reassignment ticket may be issued while the request is still being processed. The ticket may contain a number identifying this reassignment ticket and an optional identifier specifying the completion queue for asynchronous mode.

Once the reassignment ticket is issued, the completion of the request will be notified on a completion queue for asynchronous mode (step (h)) instead of the original completion queue that the host driver has been polling. The device also generates an interrupt (e.g., hardware interrupt to host) upon completion (step (i)). In some embodiments, the completion notice that is to be posted on the completion queue includes an identifier to identify the reassignment ticket.

In the mean time, the host driver, now holding the reassignment ticket, exits the polling loop and then enters into the asynchronous mode operation (step (g)). The host driver may thereby suspend the current process and free-up the CPU. Later, when the device is done processing the request, the device raises the interrupt (step (i)), which triggers the interrupt handler of the host driver. The host driver may then check the completion queue for asynchronous mode (step (j)), trying to match the number of the reassignment ticket for the original request. When the host driver finds a match, it wakes up and resumes the suspended process that originated the request (step (k)).

Figure 4:
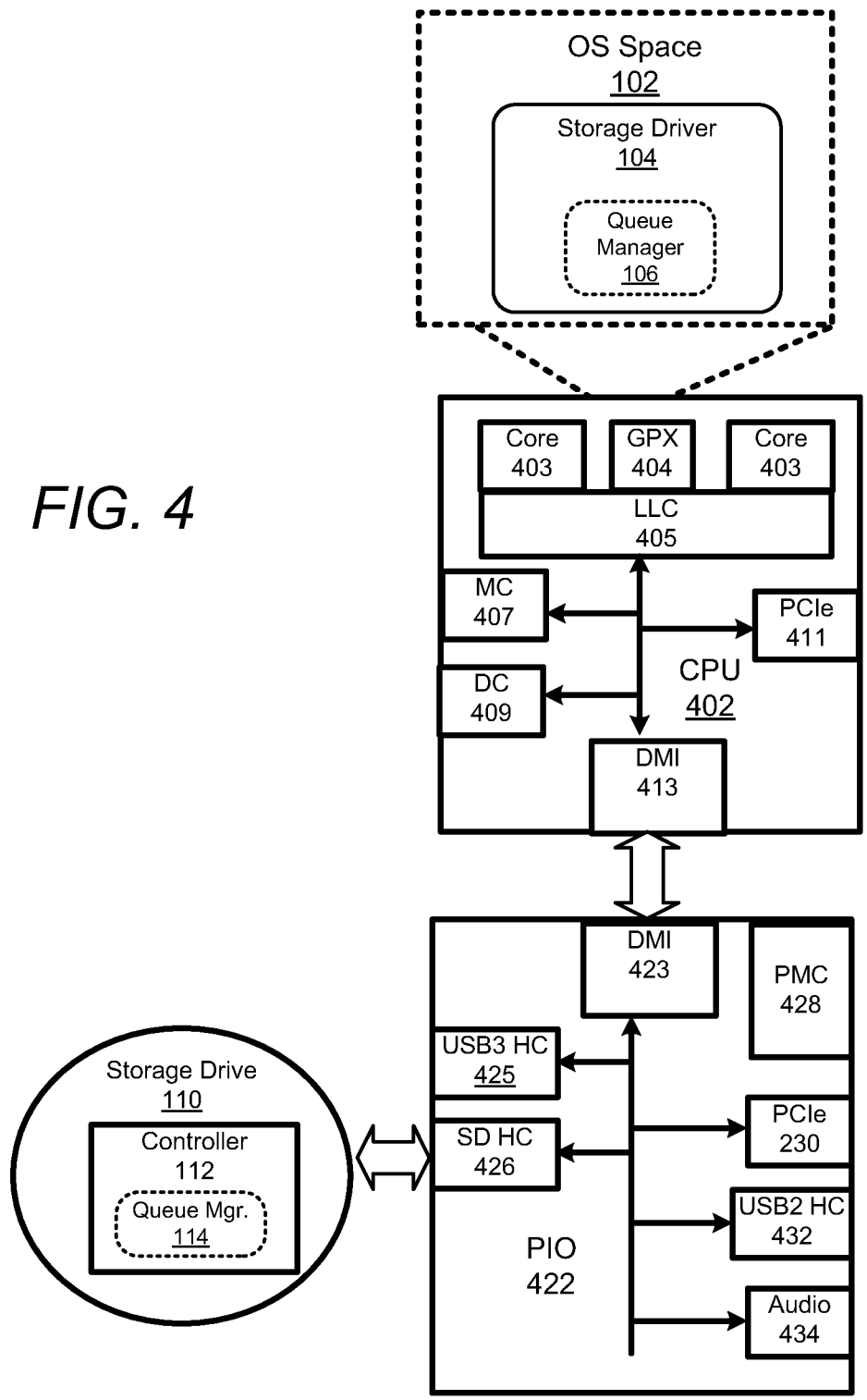
FIG. 4 is a diagram showing a computing system with a host-to-storage drive transfer processing scheme in accordance with some embodiments.

FIG. 4 is a block diagram of an exemplary platform having a storage drive with a queue manager for processing transfer requests with a corresponding host driver. The computing platform has a CPU chip 402 and a platform I/O chip 422 coupled together via a direct media interconnect (DMI) link via DMI interfaces 413/423. The platform also includes a storage drive 110 (e.g., a solid state PCM drive in accordance with the drive of FIG. 1) coupled to a storage drive host controller 112.

The CPU chip 413 comprises one or more processor cores 403, a graphics processor 404, low level cache (LLC) 405, memory controller 407, a display interface controller 409, and a PCI Express interface controller 411. (Cooperating devices such as memory, a display, network interfaces, and other peripheral devices that may be part of the depicted platform when in operation are not depicted for convenience, but nonetheless, may be part of various different embodiments.) One or more of the cores 403 execute operating system software (OS space) 102. The OS software includes a storage driver 104 to facilitate data transfers between the platform and the storage drive 110. The storage driver 104 includes a queue manager 106 to facilitate synchronous, asynchronous, and/or dynamically re-assignable transfer requests, in accordance with some embodiments discussed herein.

The PIO chip 422 includes various peripheral device interfaces such as a USB2 interface 432, audio interface 434, PCIe interface 430, and USB3 interface 425. It also includes a power management controller (PMC) 428 to manage power allocation and some of the power management policies for the platform. The PIO chip also includes a storage drive host controller 426 for facilitating an interface between the storage drive 110 and the host (e.g., via one or more cores or the graphics processor). For example, the host controller 426 could implement an AHCI or a SATA compliant controller.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

What is claimed is:

1. An apparatus, comprising:
   a storage drive having a storage drive controller to issue a reassignment ticket to break a CPU polling loop to transition a transfer request to an asynchronous process, wherein the reassignment ticket is implemented through a completion queue.

2. The apparatus of claim 1, in which the reassignment ticket includes a delivery destination of a completion notice for the completion queue.

3. The apparatus of claim 1, in which the controller determines if the transfer request process should be changed to the asynchronous mode.

4. The apparatus of claim 3, in which the controller determines if the transfer request process should change based on a time-out event for a transfer task associated with the transfer request.

5. The apparatus of claim 1, comprising a host CPU to execute a storage driver to initiate a submission queue in a synchronous mode resulting in the polling loop.

6. The apparatus of claim 5, in which the storage driver is to determine if a task request should be processed in a synchronous or an asynchronous mode.

* * * * *